US012780736B2

(12) United States Patent
Chen et al.

(10) Patent No.: US 12,780,736 B2
(45) Date of Patent: Nov. 3, 2026

(54) 18H HEXAFERRITE, METHOD OF MANUFACTURE, AND USES THEREOF

(71) Applicant: ROGERS CORPORATION, Chandler, AZ (US)

(72) Inventors: Yajie Chen, Andover, MA (US); Lance Young, Shrewsbury, MA (US)

(73) Assignee: ROGERS CORPORATION, Chandler, AZ (US)

( * ) Notice: Subject to any disclaimer, the term of this patent is extended or adjusted under 35 U.S.C. 154(b) by 463 days.

(21) Appl. No.: 18/388,229

(22) Filed: Nov. 9, 2023

(65) Prior Publication Data

US 2024/0158302 A1 May 16, 2024

Related U.S. Application Data

(60) Provisional application No. 63/424,616, filed on Nov. 11, 2022.

(51) Int. Cl.
*C04B 35/26* (2006.01)
*C04B 35/626* (2006.01)
(Continued)

(52) U.S. Cl.
CPC .... *C04B 35/2633* (2013.01); *C04B 35/62675* (2013.01); *C04B 35/62695* (2013.01); *C04B 35/634* (2013.01); *C04B 35/64* (2013.01); *H01F 1/348* (2013.01); *C04B 2235/3215* (2013.01); *C04B 2235/3232* (2013.01); *C04B 2235/3279* (2013.01); *C04B 2235/3281* (2013.01); *C04B 2235/6567* (2013.01); *C04B 2235/658* (2013.01); *C04B 2235/767* (2013.01);
(Continued)

(58) Field of Classification Search
CPC . H01F 1/37; H01F 1/348; H01F 27/24; H01F 41/02; C04B 35/2633; C04B 35/62675; C04B 35/62695; C04B 35/64; C04B 35/634; C04B 2235/6567; C04B 2235/96; C04B 2235/3215; C04B 2235/3232; C04B 2235/3279; C04B 2235/3281; C04B 2235/658
See application file for complete search history.

(56) References Cited

U.S. PATENT DOCUMENTS 3,020,426 A 2/1962 Van Der Burgt
3,461,072 A 8/1969 Winkler
(Continued)

FOREIGN PATENT DOCUMENTS

CN 102408202 A 4/2012
CN 103304186 A 9/2013
(Continued)

OTHER PUBLICATIONS

Savage et al., Magnetic Properties of single Crystal CuNi—18H and MgZn018H Solid Solutions, AIP Conference Proceeding, 1975, vol. 24, pp. 491-492.*
(Continued)

*Primary Examiner* — C Melissa Koslow
(74) *Attorney, Agent, or Firm* — CANTOR COLBURN LLP

(57) ABSTRACT

A ferrite composition having a formula of $Ba_xNi_{2-y}Cu_yTi_3Fe_zO_{31}$, wherein 4.5≤x≤5.5, 0<y<2 or 0.05≤y≤1.5, and 11≤z≤13.

19 Claims, 6 Drawing Sheets

(51) Int. Cl.

| | |
|---|---|
| ***C04B 35/634*** | (2006.01) |
| ***C04B 35/64*** | (2006.01) |
| ***H01F 1/34*** | (2006.01) |
| ***H01F 1/37*** | (2006.01) |
| ***H01F 27/24*** | (2006.01) |
| ***H01F 41/02*** | (2006.01) |

(52) U.S. Cl.
CPC ............ *C04B 2235/96* (2013.01); *H01F 1/37* (2013.01); *H01F 27/24* (2013.01); *H01F 41/02* (2013.01)

(56) References Cited

U.S. PATENT DOCUMENTS

| | | | |
|---|---|---|---|
| 4,664,831 | A | 5/1987 | Hibst et al. |
| 4,911,957 | A | 3/1990 | Oishi et al. |
| 4,957,812 | A | 9/1990 | Aoki et al. |
| 5,593,612 | A | 1/1997 | Lubitz |
| 6,071,430 | A | 6/2000 | Lebourgeois et al. |
| 6,358,432 | B1 | 3/2002 | Tomono et al. |
| 6,436,307 | B1 | 8/2002 | Lebourgeois et al. |
| 6,736,990 | B2 | 5/2004 | Aoki et al. |
| 8,263,224 | B2 | 9/2012 | Tokiwa |
| 10,468,169 | B2 | 11/2019 | Chen et al. |
| 10,766,786 | B2 | 9/2020 | Chen et al. |
| 2002/0039667 | A1 | 4/2002 | Takaya et al. |
| 2002/0050309 | A1 | 5/2002 | Marusawa |
| 2003/0052298 | A1 | 3/2003 | Wang et al. |
| 2003/0091841 | A1 | 5/2003 | Marusawa |
| 2004/0069969 | A1 | 4/2004 | Endo et al. |
| 2005/0123743 | A1 | 6/2005 | Martinazzo |
| 2007/0231614 | A1 | 10/2007 | Kondo et al. |
| 2008/0149882 | A1 | 6/2008 | Terazono et al. |
| 2009/0057606 | A1 | 3/2009 | Tada et al. |
| 2009/0297432 | A1 | 12/2009 | Hill |
| 2012/0229354 | A1 | 9/2012 | Ishikura et al. |
| 2013/0115160 | A1 | 5/2013 | Hill et al. |
| 2013/0292602 | A1 | 11/2013 | Hill |
| 2014/0291571 | A1 | 10/2014 | Riden |
| 2014/0346387 | A1 | 11/2014 | Hill et al. |
| 2016/0086728 | A1 | 3/2016 | Suetsuna et al. |
| 2016/0113113 | A1 | 4/2016 | Sethumadhavan et al. |
| 2016/0118171 | A1 | 4/2016 | Hill |
| 2016/0276072 | A1 | 9/2016 | Sethumadhavan et al. |
| 2017/0213628 | A1 | 7/2017 | Chen et al. |
| 2017/0222331 | A1 | 8/2017 | Pance et al. |
| 2018/0016157 | A1 | 1/2018 | Chen et al. |
| 2019/0013128 | A1 | 1/2019 | Chen et al. |
| 2019/0221343 | A1 | 7/2019 | Chen et al. |
| 2019/0264005 | A1 | 8/2019 | Horn et al. |
| 2019/0318858 | A1 | 10/2019 | Chen et al. |
| 2021/0020343 | A1 | 1/2021 | Chen et al. |
| 2021/0032121 | A1 | 2/2021 | Li et al. |
| 2021/0043346 | A1 | 2/2021 | Li et al. |
| 2021/0065943 | A1 | 3/2021 | Zhang et al. |
| 2021/0179442 | A1 | 6/2021 | Chen et al. |
| 2021/0225566 | A1 | 7/2021 | Zhang et al. |
| 2021/0246046 | A1* | 8/2021 | Chen .................. C01G 49/0063 |
| 2021/0261433 | A1 | 8/2021 | Chen et al. |
| 2022/0367093 | A1 | 11/2022 | Chen et al. |
| 2022/0367094 | A1 | 11/2022 | Chen et al. |
| 2023/0352221 | A1 | 11/2023 | Chen et al. |
| 2023/0352222 | A1 | 11/2023 | Chen et al. |
| 2023/0352223 | A1 | 11/2023 | Chen et al. |
| 2023/0399237 | A1 | 12/2023 | Chen et al. |
| 2024/0203624 | A1 | 6/2024 | Chen et al. |

FOREIGN PATENT DOCUMENTS

| | | | |
|---|---|---|---|
| CN | 103613373 | A | 3/2014 |
| CN | 104193224 | A | 12/2014 |
| DE | 3907220 | | 9/1990 |
| EP | 1652829 | A2 | 5/2006 |
| EP | 2784044 | A1 | 10/2014 |
| EP | 3012843 | A1 | 4/2016 |
| GB | 1105788 | A | 3/1968 |
| JP | S6245005 | A | 2/1987 |
| JP | 62216922 | A | 9/1987 |
| JP | S36365085 | A | 3/1988 |
| JP | 6489504 | A | 4/1989 |
| JP | H01200605 | A | 8/1989 |
| JP | H02120237 | A | 5/1990 |
| JP | H0615411 | B2 | 3/1994 |
| JP | H09167703 | | 6/1997 |
| JP | H09232123 | A | 9/1997 |
| JP | 2000235916 | A | 8/2000 |
| JP | 2001085210 | A | 3/2001 |
| JP | 2008169378 | A | 7/2008 |
| JP | 2010109056 | A | 5/2010 |
| JP | 2015191935 | A | 11/2015 |
| WO | 9600454 | A1 | 1/1996 |
| WO | 2011081399 | A2 | 7/2011 |
| WO | 2012103020 | A2 | 8/2012 |
| WO | 2016064459 | | 4/2016 |
| WO | 2016123598 | A1 | 8/2016 |
| WO | 2017068444 | | 4/2017 |
| WO | 2017127388 | A1 | 7/2017 |
| WO | 2020162295 | A1 | 8/2020 |
| WO | 2021061599 | A1 | 4/2021 |
| WO | 2021162886 | A1 | 8/2021 |

OTHER PUBLICATIONS

Shigemura, Synthesis of non-magnetic-ion substituted Ca-based M-type ferrite, Journal of the Magnetics Society of Japan, 2017, vol. 41, Issue 5, pp. 94-98, Released on J-STAGE Sep. 1, 2017 (Year: 2017).

Aoyama et al.; "Preparation and Characterization of Z-type Hexaferrites, Ba3(1-x)Sr3xCo2Fe24O41 with x=0-0.5, via a two-step calcination with an intermediate wet milling"; J. Electroceram; 17; pp. 61-64 (2006).

Bid et al.; "Microstructure Characterization of Mechanosynthesized Nanocrystalling NiFe2O4 by Rietveld's Analysis"; Physica E 39; pp. 175-184; (2007).

Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.

Brando et al., "Microwave Electromagnetic Characteristics of New Substituted M-Hexaferrites BaFe12-2xAxMexO19 (A = Ru, Ir ; Me = Co, Zn)", Journal De Physique IV France, Mar. 1997.

Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.

Cao et al. "Hydrogen-Induced Lateral Growth of Nickel Coating on Ba3Co2Fe24041•Co2Z-Based Hexaferrite during the Electroplating of Multilayer Chip Inductors," Journal of The Electrochemical Society, 2002, vol. 149 Issue 12, pp. J89-J92.

Faouri et. al., "High quality factor cold sintered Li2MoO4—BaFe12O19 composites for microwave applications," Mar. 2019, Acta Materialia, vol. 166, pp. 202-207.

Haijun et al., "The preparation and microwave properties of Ba3ZnzCo2-zFe24041 ferrite by citrate sol-gel process", Materials Science and Engineering, B84, 2001, pp. 252-257.

Ismail et al.; "Magnetic Properties of Mechanically Alloyed Cobalt-Zinc Ferrite Nanoparticles"; J. Supercond Nov Magn; 27; pp. 1293-1298; (2014).

Kim et al., "Effects of in3+ site occupancy on the magnetic properties of M-type strontium hexaferrites", AIB Advances 10, 015040 (2020); https://doi.org/10.1063/1.5130073; 5 pages.

Kim, H., et al. "Epitaxial growth of Zn2Y ferrite films by pulsed laser deposition," Journal of Vacuum Science, American Institute of Physics, 2 Huntington Quadrangle, Melville, NY 11747; vol. 17; No. 5; Sep. 1999; pp. 3111-3114.

Kohn, J.A. and Eckart, D.W. "Cell, Symmetry and Basic Structure of A New Ferrimagnet," Mat. Res. Bull., vol. 6, pp. 743-748, 1971.

(56) References Cited

OTHER PUBLICATIONS

Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Kristiantoro et al. , "Magnetic properties of cobalt ferrite synthesized by mechanical alloying", from AIP Conf 1964, 020003 (2018) Published Online May 15, 2018; 5 pages.

Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

Lee et al., "Low Loss Co2Z (Ba3Co2Fe24O41)-Glass Composite for Gigahertz Antenna Application," Journal of Applies Physics, 2011, vol. 109, 07E530-2.

Li et al. "High-frequency magnetic properties of W-type barium-ferrite BaZn2-xCoxFe16O27 composites", Journal of Applied Physics 94, 5918 (2003): https://doi.org/10.1063/1.1618945.

Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.

Li et al; "Static and Dynamic Magnetic Properties of Co2Z Barium Ferrite Nanoparticle Composites"; Journal of Materials Science, 40, pp. 719-723 (2005).

Li, Jie, et al. "Structural and magnetic properties of M-Ti (M = Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Li, Qifan, et al. "Emerging magnetodielectric materials for 5G communications: 18H hexaferrites," Acta Materialia 231 (2022) 117854 Elsevier Ltd., 10 pages.

Lui, Chaocheng, et al. "Characterizations of magnetic transition behavior and electromagnetic properties of Co—Ti co-substituted SrM-based hexaferrites SrCoxTixFe12-2xO19 compounds," Journal of Alloys and Compounds, vol. 784, Jan. 11, 2019, pp. 1175-1186.

Mahmood, Sami H., et al. "Modification of the Magnetic Properties of Co<sub>2</sub>Y Hexaferrites by Divalent and Trivalent Metal Substitutions," Solid State Phenomena, vol. 241; Oct. 2015, pp. 93-125.

Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

Morch et al. "Structure and Magnetic properties of W-type hexaferrites," 2019, IUCRJ, pp. 492-499, vol. 6.

Mu et al., "Improvement of high-frequency characteristics of Z-type hexaferrite by dysprosium doping", Journal of Applied Physics, 109, 123925, 2011, 6 pages.

Narayanasamy et al., "Influence of Mechanical Milling and Thermal Annealing on Electrical And Magnetic Properties of Nanstructured Ni—Zn and Coblat Ferrites," Jun. 2208, Bull Mater Sci., vol. 31 No. 3, pp. 373-380.

Obol et al.; "Oriented Y-type Hexaferrites for Ferrite Device"; J. Appl. Phys.; 91(10); pp. 7616-7618; (2002).

Pullar et al; "Hexagonal Ferrites: A Review of the Synthesis, Properties and Applications of Hexaferrite Ceramica"; Progress in Materials Science; 57; pp. 1191-1134; (2012).

Pullar, "Hexagonal Ferrite Fibres and Nanofibres," Trans Tech Publications, 2016, pp. 1-68, vol. 241.

Pullar, "Magnetic Properties of Aligned Co2Z Hexagonal Z-Ferrite Fibers," International Journal of Applied Ceramic Technology, 2014, pp. 451-456, vol. 11, No. 3.

Sahoo et al. Enhanced Magnetoelectricity in Bismuth Substituted SrFe12O19 Hexaferrite, Aug. 2019, Journal of Applied Physics, vol. 126, No. 7.

Savage, R. O. et al., "Magnetic Properties of Single Crystal CuNi—18H and MgZn—18H Solid Solutions", AIP Conference Proceedings (1975). vol. 24, pp. 491-492, doi.org/10.1063/1.29974.

Singh et al. "Static Magnetic Properties of Co and Ru substituted Ba—Sr ferrite," 2008, Materials Research Bulletin, pp. 176-184, vol. 43.

SU et el., "Low Loss Factor Co2Z Ferrite Composites with Equivalent Permittivity and Permeability for Ultra-high Frequency Applications," Applied Physics Letters, Aug. 2014, vol. 105 No. 062402.

Tauber, A et al., "Magnetic Properties of a Unique 18-Layer Hexagonal Ferrite", Journal of Applied Physics 42, 1738 (1971); https://doi.org/10.1063/1.1660419; Published Online: Dec. 19, 2003; 4 pages; https://doi.org/10.1063/1.1660419.

Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.

Waje et al.; "Sintering Temperature dependence of Room Temperature Magnetic and Dielectric Properties of Co0.5Zn0.5F32O4 Prepared using Mechanically Alloyed Nanoparticles"; Journal of magnetism and Magnetic Materials; 322; pp. 686-691; (2010).

Watanabe Kazuya et al., "Discovery of the New Crystallographic Phase Of an Exotic Magnetic Oxide: 118H-type Hexaferrite," Journal of the physical society of Japan, Jan. 15, 2020, vol. 89, No. 1, p. 014704.

Carvalheiras et al. "Synthesis of red mud derived M-type barium hexaferrites with tuneable coercivity", Ceramics International, vol. 46, No. 5, Nov. 7, 2019, pp. 5757-5764, XP086001988.

Deng, et al; Effect of Bi and Mo Doping on Magnetic and Sintered Characteristics of MgCuZn Ferrite, Journal of Inorganic Materials, 2008, pp. 670-672, vol. 23 No. 4.

Guo, Li, et al. "Low temperature co-fired CoZZ barium-strontium ferrite materials with BBSC glass" J Mater Sci: Mater Electron, vol. 27, pp. 2841-2845, Nov. 26, 2015.

International Search Report and Written Opinion for International Application No. PCT/US2023/037053, International Filing Date Nov. 9, 2023, Date of Mailing Feb. 29, 2024, 12 pages.

Pasko et al. "Magnetic and Structural characterization of nanosized BaCoxZn2-xFe16O27 hexaferrite in the vicinity of spin reorientation transition," 2011, Journal of Physics: Conference Series 303.

Wang, Yu, et al. "Study on Microwave Performance of Low-Temperature Sintered, Ba(CoTi)1.5Fe9O19 Ferrite for Application at UHF Frequency" J Supercon Nov Magn, vol. 31, pp. 455-461, Jul. 6, 2017.

You, Jae-Hyoung, et al. Magnetic Properties of Zn-substituted Y-type hexaferrites, Ba2ZnFe2-xFe12O22, Journal of Magnetism and Magnetic Materials, 471 (2019) 255-261.

* cited by examiner

18H HEXAFERRITE, METHOD OF MANUFACTURE, AND USES THEREOF

CROSS REFERENCE TO RELATED APPLICATION

This application claims the benefit of U.S. Provisional Application Ser. No. 63/424,616, filed Nov. 11, 2022, which is incorporated herein by reference in its entirety.

BACKGROUND

The present disclosure relates to 18H hexaferrite compositions, for example with high frequency magnetic permeability, composites including the 18H hexaferrite compositions, methods of manufacture, and uses thereof.

Improved performance and miniaturization are needed to meet the ever-increasing demands of devices used in ultra-high frequency, L-band, and S-band applications, which are of interest in a variety of commercial and defense related industries. As an important component in radar and modern wireless communication systems, antenna elements with compact size are constantly being developed. It has, however, been challenging to develop ferrite materials for use in such high frequency applications as most ferrite materials exhibit relatively high magnetic loss at high frequencies. The method of making ferrite materials can impact the crystalline structure of the materials, thus improving performance.

There accordingly remains a need for ferrite materials that are of low magnetic loss, high magnetic permeability, and low dielectric constant and dielectric loss in the gigahertz range, and methods of making the ferrite materials.

BRIEF SUMMARY

A ferrite composition has a formula of $Ba_xNi_{2-y}Cu_yTi_3Fe_zO_{31}$, wherein $4.5 \leq x \leq 5.5$, $0<y<2$ or $0.05 \leq y \leq 1.5$, and $11 \leq z \leq 13$.

A method of manufacturing a ferrite composition includes calcining blended metal source compounds for the ferrite composition; reducing particle size of the calcined source compounds to obtain particles having an average particle size of 0.5 to 100 micrometers or 0.5 to 10 micrometers; granulating a mixture of the particles and a binder to obtain granules; compressing granules into a green body; and sintering the green body to form the ferrite composition.

A composite includes a polymer matrix and the ferrite composition.

Articles including the ferrite composition or composite are also described, including an antenna, an inductor, a transformer, or an anti-electromagnetic interference material.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

It was discovered that 18H-type ferrite compositions including nickel and copper have a low magnetic loss tangent and high magnetic permeability at high frequency, while also exhibiting a low dielectric loss tangent and high permittivity. It was further discovered that properties of the ferrite composition, for example, magnetic permeability, saturation magnetization, coercivity, Curie temperature, cut-off frequency (resonance frequency), or a combination thereof can be adjusted by varying the copper content, for example, a molar ratio of copper to nickel in the ferrite composition.

Advantageously, the 18H-type ferrite compositions are cost-effective to prepare since they require no expensive elements, such as rare earth or noble elements. When compounded with a polymer, the ferrite compositions provide composites having low magnetic loss, high magnetic permeability, low dielectric constant, and low dielectric loss. The ferrite compositions and composites described herein are useful in applications such as antenna substrates, inductor cores, and electromagnetic interference (EMI) suppressors over a wide range of frequency (0.5 to 10 gigahertz (GHz)).

Figure 1:
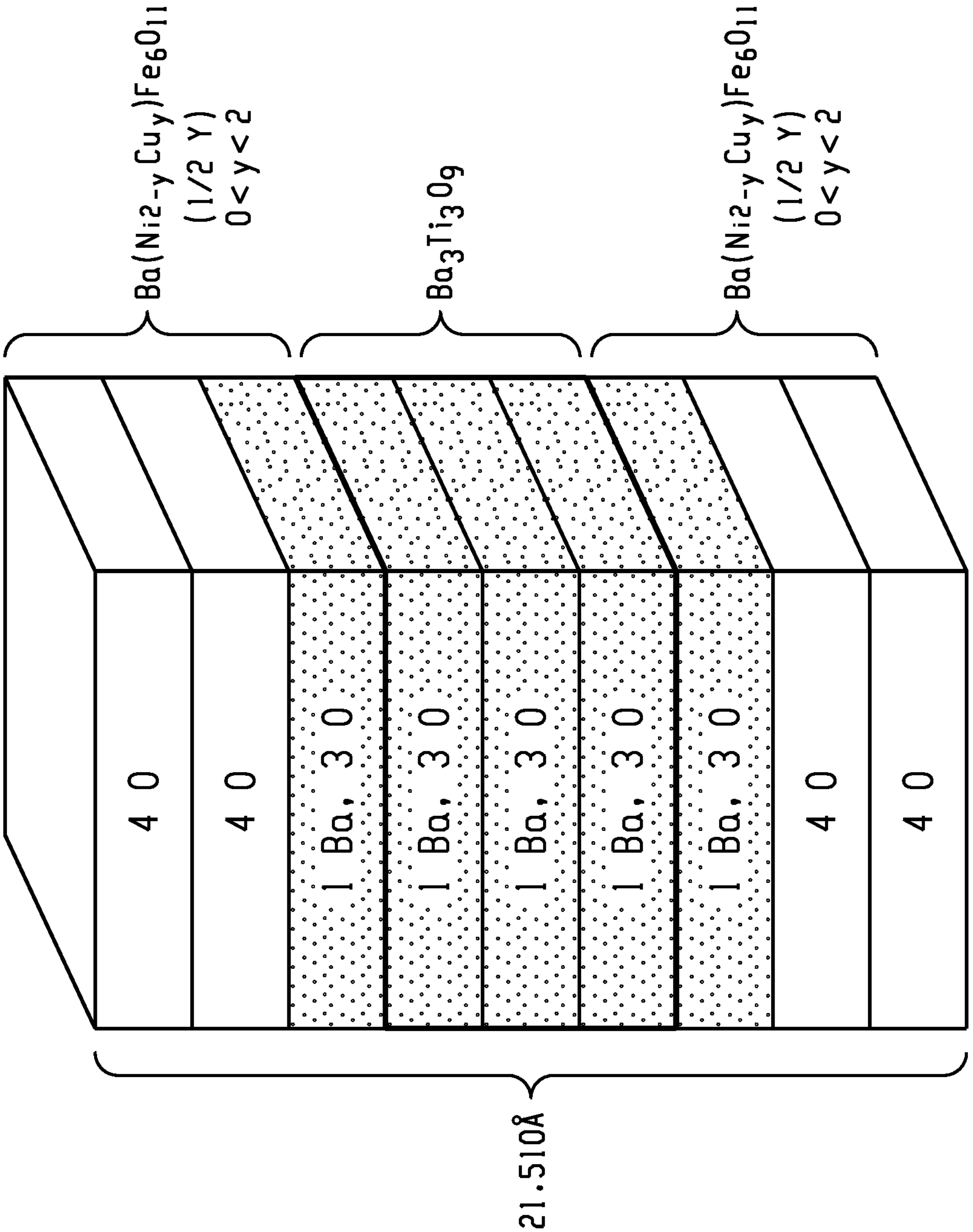
FIG. 1 presents a schematic diagram of one-half of the 18-layer stacking sequence for the unit cell of the 18H hexaferrite $Ba_5Ti_3Ni_{2-y}Cu_yFe_{12}O_{31}$, wherein $0<y<2$.

FIG. 1 presents a schematic diagram of one-half of the 18-layer stacking sequence for the unit cell of the 18H hexaferrite $Ba_5Ti_3Ni_{2-y}Cu_yFe_{12}O_{31}$, wherein $0<y<2$, showing 3 layers of half Y block, 3 layers of hexagonal barium titanate (HBT) and 3 layers of half Y block. Actual distribution of interstitial cations can differ in order to provide path for magnetic coupling along c-axis. The HBT layer can also contain iron ion; copper ion; nickel ion; or a combination thereof.

A ferrite composition has a formula of $Ba_xNi_{2-y}Cu_yTi_3Fe_zO_{31}$, wherein $4.5 \leq x \leq 5.5$, $0<y<2$ or $0.05 \leq y \leq 1.5$, and $11 \leq z \leq 13$. The ferrite composition can have an 18H structure. The ferrite composition can have in-plane (basal c-plane) easy magnetization (also called planar anisotropy). The ferrite composition can be a single crystal or polycrystalline ferrite composition.

The ferrite composition can have a Curie temperature of greater than or equal to 200° C., greater than or equal to 210° C., greater than or equal to 220° C., greater than or equal to 230° C., greater than or equal to 240° C., or greater than or equal to 250° C. The ferrite composition can have a Curie temperature of less than or equal to 300° C. An 18H-type ferrite composition not including nickel and copper can have a Curie temperature of less than 180° C.

The ferrite composition can have a coercivity of less than 50 oersteds (Oe) (3.98 kiloamperes per meter (kA/m)), less than 30 Oe (2.39 kA/m), less than 15 Oe (1.19 kA/m), less than 5 Oe (0.40 kA/m), less than 4 Oe (0.32 kA/m), less than 3 Oe (0.24 kA/m), less than 2 Oe (0.16 kA/m), or less than 1 Oe (0.08 kA/m). The ferrite composition can have a coercivity of greater than 0 Oe (0 kA/m), greater than 0.01 Oe (0.80 amperes per meter (A/m), or greater than 0.1 Oe (7.96 A/m). An 18H-type ferrite composition not including nickel and copper can have a coercivity of greater than 50 Oe (3.98 kA/m).

Grain size of the ferrite composition can be selected to provide the ferrite composition with magneto-dielectric properties suitable for a given application. Grain size can be controlled by control of ferrite synthesis conditions, for example the temperature, time of heating, and rate of heating or cooling. The average grain size of the ferrite composition can be 1 to 100 μm, or 5 to 50 μm. Average grain size can be determined, for example, by X-ray diffractometry (XRD), scanning electron microscopy (SEM), transmission electron microscopy (TEM), or a combination thereof.

The ferrite composition can have a formula of $$Ba_xNi_{2-y}Cu_yTi_3Fe_zO_{31},$$

wherein 5.0≤x≤5.1, 0.05≤y≤1.5, and 11.7≤z≤12.0. In an embodiment, x=5.1. In an embodiment, z=11.7. In an embodiment, the ferrite composition can have a formula of $Ba_{5.1}Ni_{1.8}Cu_{0.2}Ti_3Fe_{11.7}O_{31}$, $Ba_{5.1}Ni_{1.6}Cu_{0.4}Ti_3Fe_{11.7}O_{31}$, $Ba_{5.1}Ni_{1.4}Cu_{0.6}Ti_3Fe_{11.7}O_{31}$, $Ba_{5.1}Ni_1Cu_{1.0}Ti_3Fe_{11.7}O_{31}$, $Ba_{5.1}Ni_{0.8}Cu_{1.2}Ti_3Fe_{11.7}O_{31}$, $Ba_{5.1}Ni_{1.7}Cu_{1.3}Ti_3Fe_{11.7}O_{31}$, $Ba_{5.1}Ni_{1.6}Cu_{1.4}Ti_3Fe_{11.7}O_{31}$, or $Ba_{5.1}Ni_{0.5}Cu_{1.5}Ti_3Fe_{11.7}O_{31}$.

The ferrite composition can have a magnetic permeability (μ) of 1.5 to 2 at a frequency of 1 to 9 GHz; a magnetic loss tangent (tan $\delta_N$) of less than 0.05 at a frequency of 1 to 9 GHz; a permittivity (ε) of 10 to 15 at a frequency of 1 to 9 GHz; a dielectric loss tangent (tan $\delta_\varepsilon$) of less than 0.004 at a frequency of 1 to 3 GHz; a cutoff frequency (resonance frequency, $f_r$) greater than 10 GHz; or a combination thereof. In an embodiment, the ferrite composition has both a magnetic permeability (μ) of 1.5 to 2 at a frequency of 1 to 9 GHz and a magnetic loss tangent (tan $\delta_\mu$) of less than 0.05 at a same frequency.

The hexaferrite particles can be manufactured by any suitable method, for example, a ceramic process, sol-gel process, hydrothermal synthesis, co-precipitation method, or thermal plasma sintering. Examples of methods of manufacturing the ferrite composition include a one-step sintering ceramic process and a wet-chemical process. In an embodiment, a method of manufacturing the ferrite composition can include calcining blended metal source compounds for a desired ferrite composition; reducing particle size of the calcined source compounds to obtain particles having an average particle size of 0.5 to 100 μm or 0.5 to 10 μm; granulating a mixture of the particles and a binder to obtain granules; compressing granules into a green body; and sintering the green body to form the ferrite composition.

A metal source compound is a compound needed for synthesis of a ferrite. The metal source compounds can be selected based on factors such as cost and availability. Exemplary source compounds for a given metal include oxides, carbonates, acetates, nitrates, sulfates, or chlorides of the metal. Exemplary precursors include a barium carbonate (for example, $BaCO_3$), an iron oxide (for example, $\alpha$-$Fe_2O_3$, $Fe(NO_3)_3 \cdot 9H_2O$, $FeCl_3 \cdot 6H_2O$, or $Fe_2(SO_4)_3 \cdot H_2O$), a nickel oxide (for example, NiO), a titanium oxide (for example $TiO_2$), and a copper oxide (for example, CuO). The metal source compounds can be combined in amounts to achieve the desired metal stoichiometry. In an embodiment, a desired metal stoichiometry can be non-stoichiometric, for example, iron deficient (e.g., z in the formula $Ba_xNi_{2-y}Cu_yTi_3Fe_zO_{31}$ can be 11.7 rather than 12).

Calcining the blended metal source compounds can be performed at a suitable temperature for a length of time to synthesize the desired ferrite and achieve a desired grain size. For example, the temperature can be 800 to 1,300° C., or 900 to 1,200° C., or 1,000 to 1,200° C. The length of time can be, for example 0.5 to 200 hours, 0.5 to 20 hours, or 1 to 15 hours. Calcining is performed in an atmosphere of air, nitrogen, oxygen, or a combination thereof. The heating rate or the cooling rate for calcining in a furnace can also be selected to obtain a desired ferrite, grain size, or structural morphology. For example, the heating rate or the cooling rate can be 2 to 3° C. per minute.

Reducing particle size of the calcined blend can be performed by any suitable method. Examples of methods to reduce particle size include crushing, grinding, milling, mechanical milling, and a combination thereof. Examples of devices to reduce particle size include a media mill, ball mill, two-roll mill, three-roll mill, bead mill, air-jet mill, and a cryogenic grinder. After reducing the particle size, the particles can be subjected to a sizing procedure, such as sieving, to alter the particle size distribution.

Granulating a mixture of the ferrite particles and a binder can be performed by any suitable method, for example by a spray-drying granulation method or an oscillating extrusion granulating method. For example, a slurry of the ferrite particles, binder, and various additives as desired can be dispersed in a solvent, such as water, and then the slurry can be spray-dried with, for example, a spray dryer to produce granules. In an embodiment, ferrite particles, a binder, and various additives as required can be mixed and granulated with a stirring granulator to produce a granulated powder. The granulated powder can then be extruded and granulated with an oscillating granulator to produce granules.

The binder is selected to be removable from the green body by heating and optionally for solubility in a solvent. Examples of a binder include polyvinylpyrrolidone, poly (vinyl alcohol), polyvinyl butyral, polyacrylamide, poly (acrylic acid), polyethylene glycol, polyethylene oxide, cellulose acetate, starch, polypropylene carbonate, polyvinyl acetate, and a combination thereof. In an embodiment, the binder is polyvinyl alcohol, polyvinyl butyral, or a combination thereof.

In an embodiment, granules can be formed from a mixture including ferrite particles and 0.5-5 weight percent of polyvinyl alcohol, based on a total weight of the mixture. The granules can have a size of particle size of, for example, 50 to 300 μm.

The granulated ferrite composition is molded into a predetermined shape by, for example, injection molding, calendaring lamination, extrusion molding, or a compression molding method such as a single pressing method, a double pressing method, a floating die method, or a withdrawal method, to obtain a green body. The compression machine is appropriately selected depending on the selected size, shape, and quantity of green bodies, such as a mechanical press, a hydraulic press, or a servo press. The molding pressure for forming the green body can be 0.3 to 3 metric tons per square centimeter ($MT/cm^2$), or 0.5 to 2 $MT/cm^2$.

The green body can then be sintered in a suitable atmosphere to form the ferrite composition. The sintering can occur at a sintering temperature of 800 to 1,300° C., 900 to 1,250° C., or 1,000 to 1,200° C. The sintering can occur for a sintering time of 1 to 20 hours, or 2.55 to 12 hours. The atmosphere can be air, nitrogen, oxygen, or a combination thereof. The sintering can be performed with a heating rate of 1 to 5° C. per minute, a cooling rate of 1 to 5° C. per minute, or a combination thereof.

The ferrite can be a bulk ceramic or can be present in a composite, for example, comprising ferrite particles and a polymer. A composite can include the ferrite composition and a polymer matrix. The composite can include 5 to 95 volume percent (vol. %), 10 to 90 vol. %, 20 to 80 vol. %, or 30 to 70 vol. % of the ferrite composition based on the total volume of the composite. The composite can include 5 to 95 vol. %, 10 to 90 vol. %, 20 to 80 vol. %, or 30 to 70 vol. % of the polymer based on the total volume of the composite.

The ferrite composition present in the composite have a particle size of 0.5 to 100 μm, 0.5 to 30 μm, or 1 to 10 μm. The particle size can be determined using a Horiba LA-910 laser light scattering PSD analyzer, or a comparable instrument, or as determined in accordance with ASTM D4464-15. The reported particle size is the median D50 particle size by volume. Appropriately sized ferrite composition particles can be obtained by any suitable method. For example, any suitable ceramic process or chemical process can be used to synthesize the ferrite composition particles of the desired size. In an embodiment, the ferrite composition particles can be obtained by crushing and grinding the sintered green body obtained by the method described herein.

The polymer matrix can include a thermoset or a thermoplastic polymer. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride, polyvinylidene fluoride, fluorinated ethylene-propylene, polytetrafluoroethylene, poly(ethylene-tetrafluoroethylene, or perfluoroalkoxy), polyacetals (for example, polyoxyethylene and polyoxymethylene), poly($C_{1-6}$ alkyl)acrylates, polyacrylamides (including unsubstituted and mono-N- or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones and polyether ketone ketones), polyarylene ketones, polyarylene sulfides (for example, polyphenylene sulfides), polyarylene sulfones (for example, polyethersulfones or polyphenylene sulfones), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene, low density polyethylene, and linear low density polyethylene, polypropylenes, and their halogenated derivatives (such as polytetrafluoroethylenes), and their copolymers, for example ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene or methyl methacrylate-butadiene-styrene), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers,), a paraffin wax, or a combination thereof.

Thermoset polymers are derived from thermosetting monomers or prepolymers (resins) that can irreversibly harden and become insoluble with polymerization or cure, which can be induced by heat or exposure to radiation (for example, ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, for example, poly (butadiene-isoprene)), polyisocyanates, polyureas, polyurethanes, triallyl cyanurate polymers, triallyl isocyanurate polymers, certain silicones, or polymerizable prepolymers (for example, prepolymers having ethylenic unsaturation, such as unsaturated polyesters, polyimides). The prepolymers can be polymerized, copolymerized, or crosslinked, for example, with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The polymer can include a fluoropolymer (for example, polyvinylidene fluoride or polytetrafluoroethylene), a polyolefin (for example, polyethylene, high density polyethylene, low density polyethylene), a poly(arylene ether ketone) (for example, polyether ether ketone), a poly alkyl (meth) acrylate (for example, polymethylmethacrylate), a poly (ether sulfone), or a combination thereof.

The composite can include additional additives, such as dielectric fillers or flame retardants, so long as the additive are less than 5 vol. % of the total volume of the composite.

A particulate dielectric filler can be employed to adjust the dielectric constant, dissipation factor, coefficient of thermal expansion, and other properties of the composite. Exemplary dielectric fillers include titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talc, nanoclay, magnesium hydroxide, or a combination thereof.

Flame retardants can be halogenated or unhalogenated. An exemplary inorganic flame retardant is a metal hydrate such as a hydrate of a metal such as Mg, Ca, Al, Fe, Zn, Ba, Cu, Ni, or a combination thereof. In an embodiment, the hydrates can include aluminum hydroxide, magnesium hydroxide, calcium hydroxide, iron hydroxide, zinc hydroxide, copper hydroxide, or nickel hydroxide; or a hydrate of calcium aluminate, gypsum dihydrate, zinc borate, or barium metaborate. Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, or halogenated compounds such as hexachloroendomethylenetetrahydrophthalic acid (HET acid), tetrabromophthalic acid, or dibromoneopentyl glycol, for example.

The composite can have an operating frequency of 0.5 to 10 GHz.

The composite can have a magnetic loss tangent (tan $\delta_\mu$) of less than 0.08 at a frequency of 1 to 10 GHz. Magnetic materials with such a low magnetic loss can advantageously be used in high frequency applications such as in antenna applications.

The composite can have a magnetic permeability ($\mu$) of greater than or equal to 1.2 at a frequency of 1 to 10 GHz.

The composite can have a permittivity ($\varepsilon$) of 5 to 10 at a frequency of 1 to 12 GHz.

The composite can have a dielectric loss tangent (tan $\delta_\varepsilon$) of less than 0.005 at a frequency of 1 to 12 GHz.

A method of making a composite includes combining a polymer, the ferrite composition, optionally a solvent, and any additives to form a composition. The polymer can be melted prior to or after combining with the ferrite composition. Optionally, the method further includes removing the solvent. The combining can be by any suitable method, such as blending, mixing, or stirring. In an embodiment, the polymer is molten, and the ferrite composition and optional additives are dissolved or suspended in the molten polymer. In an embodiment, the components used to form the composite, including the polymer and the ferrite composition and the optional additives, can be combined by being dissolved or suspended in a solvent to provide a mixture or solution.

The solvent, when included, is selected so as to dissolve the polymer, disperse the ferrite composition and any optional additives that can be present, and to have a convenient evaporation rate for forming and drying. A non-exclusive list of possible solvents is xylene; toluene; methyl ethyl ketone; methyl isobutyl ketone; hexane; a higher liquid linear alkane, such as heptane, octane, or nonane; cyclohexane; isophorone; various terpene-based solvents; or a blended solvent. Exemplary solvents include xylene, toluene, methyl ethyl ketone, methyl isobutyl ketone, or hexane. In an embodiment, the solvent is xylene or toluene.

The concentration of the components of the composition in the solution or dispersion is not critical and will depend on the solubility of the components, the additive level used, the method of application, and other factors. The solution can include 10 to 80 weight percent solids (all components other than the solvent), or 50 to 75 weight percent solids, based on the total weight of the solution.

Any solvent is allowed to evaporate under ambient conditions, or by forced or heated air, and the composition is cooled to provide a composite. The composition can also be shaped, for example, by extruding, molding, or casting.

The mixture can be molded, for example, by compression molding, injection molding, or reaction injection molding to form the composite. In an embodiment, the mixture can be extruded or subjected to a rolling technique to form the composite.

The composite can be prepared by reaction injection molding a thermosetting composition. The reaction injection molding can include mixing at least two streams to form a thermosetting composition and injecting the thermosetting composition into the mold, wherein a first stream can include a catalyst and the second stream can include an activating agent. One or both of the first stream and the second stream or a third stream can include a monomer. One or both of the first stream and the second stream or a third stream can include a cross-linking agent, the ferrite composition, an additive, or a combination thereof. One or both of the ferrite composition and the additive can be added to the mold prior to injecting the thermosetting composition.

The mixing can occur in a head space of an injection molding machine. The mixing can occur in an inline mixer. The mixing can occur during injecting into the mold. The mixing can occur at a temperature of greater than or equal to 0 to 200° C., or 15 to 130° C., or 0 to 45° C., or 23 to 45° C.

The mold can be maintained at a temperature of greater than or equal to 0 to 250° C., or 23 to 200° C., or 45 to 250° C., or 30 to 130° C., or 50 to 70° C. It can take 0.25 to 0.5 minutes to fill a mold, during which time, the mold temperature can drop. After the mold is filled, the temperature of the thermosetting composition can increase, for example, from a first temperature of 0 to 45° C. to a second temperature of 45 to 250° C. The molding can occur at a pressure of 65 to 350 kilopascal (kPa). The molding can occur for less than or equal to 5 minutes, or less than or equal to 2 minutes, or 2 to 30 seconds. After the polymerization is complete, the composite can be removed at the mold temperature or at a decreased mold temperature. For example, the release temperature, $T_r$, can be less than or equal to 10° C. less than the molding temperature, $T_m$ ($T_r \leq T_m - 10°$ C.).

After the composite is removed from the mold, it can be post-cured. Post-curing can occur at a temperature of 100 to 150° C., or 140 to 200° C. for greater than or equal to 5 minutes.

Also included herein are articles including the ferrite composition or the composite. The article can be a microwave device, such as an antenna or an inductor. The article can be a transformer, an inductor, or an anti-electromagnetic interference material. The article can be an antenna such as a patch antenna, an inverted-F antenna, or a planar inverted-F antenna. The article can be a magnetic bus bar, for example, for wireless charging; an NFC shielding material; or an electronic bandgap meta-material. The article can be for use in a frequency range of 1 to 10 GHz, or 2 to 12 GHz. The article can be used for a variety of devices operable within the ultrahigh frequency range, such as a high frequency or microwave antenna, filter, inductor, circulator, or phase shifter. The article can be operable at frequencies greater than or equal to 1 GHz, or at frequencies of 1 to 10 GHz for ceramics, e.g., bulk ceramics, or 2 to 12 GHz for composites. Such articles can be used in commercial and military applications, weather radar, scientific communications, wireless communications, autonomous vehicles, aircraft communications, space communications, satellite communications, or surveillance.

The following examples are provided to illustrate the present disclosure. The examples are merely illustrative and are not intended to limit the scope hereof.

EXAMPLES

A series of 18H hexaferrite compositions are made. Chemical formulas of the hexaferrites are provided in Table 1.

TABLE 1

Formulas of hexaferrite $Ba_5Mg_{2-x}Zn_xTi_3Fe_{12}O_{31}$

| Example | x | Formulation |
|---|---|---|
| 1 | 0.2 | $Ba_{5.1}Ni_{1.8}Cu_{0.2}Ti_3Fe_{11.7}O_{31}$ |
| 2 | 0.4 | $Ba_{5.1}Ni_{1.6}Cu_{0.4}Ti_3Fe_{11.7}O_{31}$ |
| 3 | 0.6 | $Ba_{5.1}Ni_{1.4}Cu_{0.6}Ti_3Fe_{11.7}O_{31}$ |

TABLE 1-continued

| Formulas of hexaferrite $Ba_5Mg_{2-x}Zn_xTi_3Fe_{12}O_{31}$ | | |
|---|---|---|
| Example | x | Formulation |
| 4 | 1.0 | $Ba_{5.1}Ni_{1.0}Cu_{1.0}Ti_3Fe_{11.7}O_{31}$ |
| 5 | 1.2 | $Ba_{5.1}Ni_{0.8}Cu_{1.2}Ti_3Fe_{11.7}O_{31}$ |
| 6 | 1.3 | $Ba_{5.1}Ni_{1.7}Cu_{1.3}Ti_3Fe_{11.7}O_{31}$ |
| 7 | 1.4 | $Ba_{5.1}Ni_{1.6}Cu_{1.4}Ti_3Fe_{11.7}O_{31}$ |
| 8 | 1.5 | $Ba_{5.1}Ni_{0.5}Cu_{1.5}Ti_3Fe_{11.7}O_{31}$ |

Each of these eight hexaferrite compositions are made in general accordance with the following procedure. The metal source compounds used are $BaCO_3$ (>99.5%), NiO (>99.5%), CuO (>99.5%), $TiO_2$ (>99.5%) and $Fe_2O_3$ (>99.2%). The metal source compounds are blended together in a wet planetary mill in ratios to provide a desired formula. The mixture of the metal source compounds are calcined by heating to 1,100° C. for a soak time of 4 hours in air. The calcined ferrite materials are then crushed and screened through a 40 #sieve. The sieved ferrite particles are then subjected to grinding in a wet planetary mill to achieve a size of 0.5 to 10 micrometers. The ground ferrite particles are mixed with 0.5 to 5 weight percent of polyvinyl alcohol and then granulated into granules by sieving through a 40 #sieve. The granules are compressed to form a ferrite green body under a pressure of 1 metric ton per square centimeter. Green bodies of two different shapes are formed: a toroid (outer diameter of 7 millimeters (mm), inner diameter of 3 mm, and thickness of 3 to 3.5 mm) for permeability and permittivity measurements or a disk (diameter of 6 mm) for magnetic hysteresis measurements.

The polyvinyl alcohol is first removed from the green bodies by heating at 600° C. for 2 hours in air followed by sintering the green bodies at 1,000 or 1,250° C. were} for 4 hours in an atmosphere of oxygen to obtain the ferrite compositions. The oxygen gas flow rate is 0.5 liters per minute, the heating ramp rate is 1 to 5° C. per minute, and the cooling rate is 1 to 5° C. per minute.

Magnetic hysteresis measurement was performed by Vibrating Sample Magnetometer (VSM). Magnetization versus temperature was measured under 50 Oe (3.98 kiloamperes per meter (kA/m) by Quantum Design Physical Property Measurement System (PPMS). Magnetic permeability/permittivity is measured in coaxial airline by vector network analyzer (VNA) in Nicholson-Ross-Weir (NRW) method over a frequency of 0.1 to 10 gigahertz (GHz).

Figure 2:
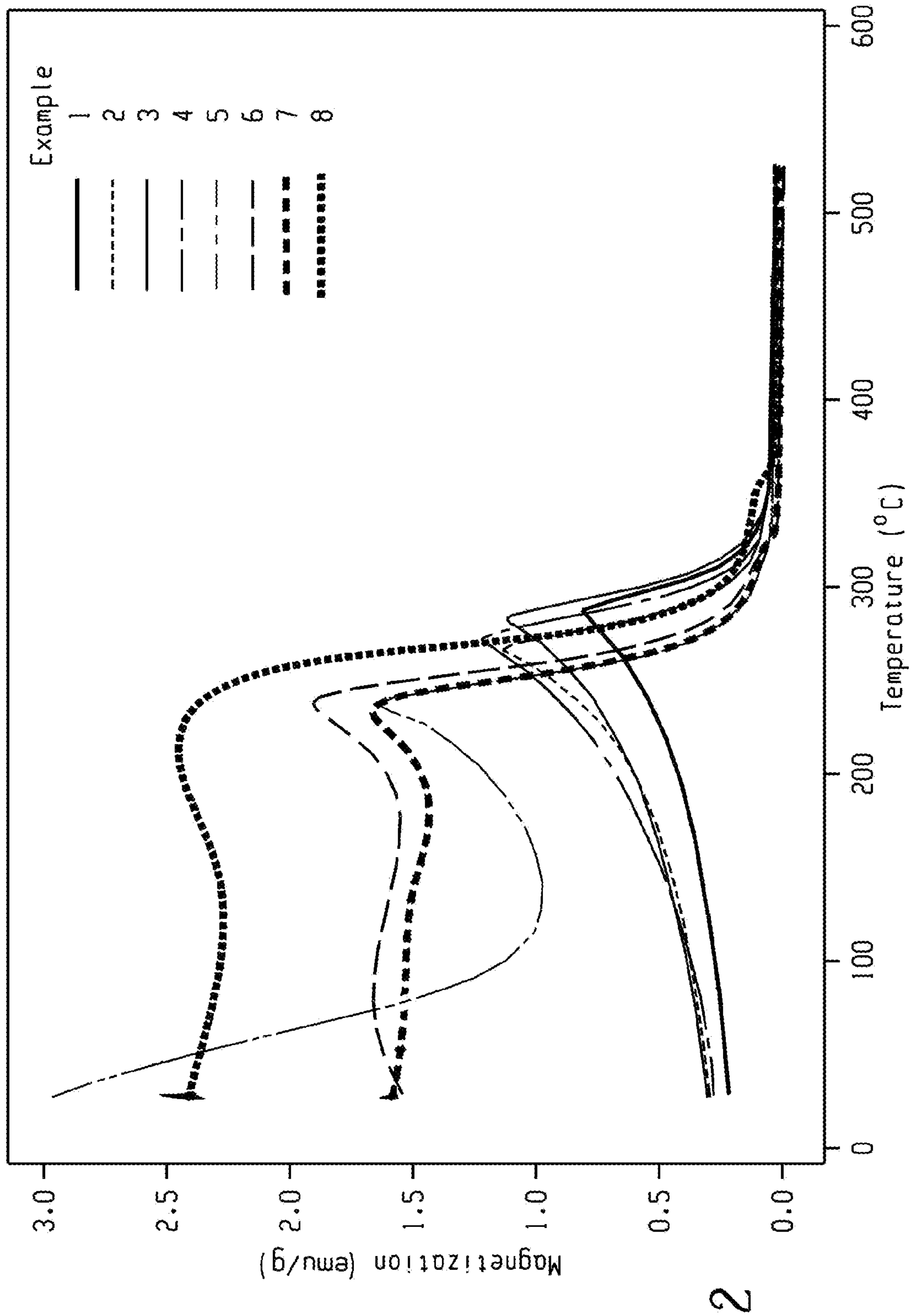
FIG. 2 is a graph of magnetization (emu/g) versus temperature (° C.) for Examples 1 to 8.

FIG. 2 is a graph of magnetization (emu/g) versus temperature (° C.) for Examples 1 to 8. FIG. 2 indicates that Examples 6 to 8, which exhibit a magnetization of greater than or equal to 1.5 (emu/g) (1.5 ampere-square meter per kilogram ($A \cdot m^2/kg$)) at temperatures of about 100 to 250° C., can provide more desirable results, for example, in terms of magnetization, than Examples 1 to 5.

Figure 3:
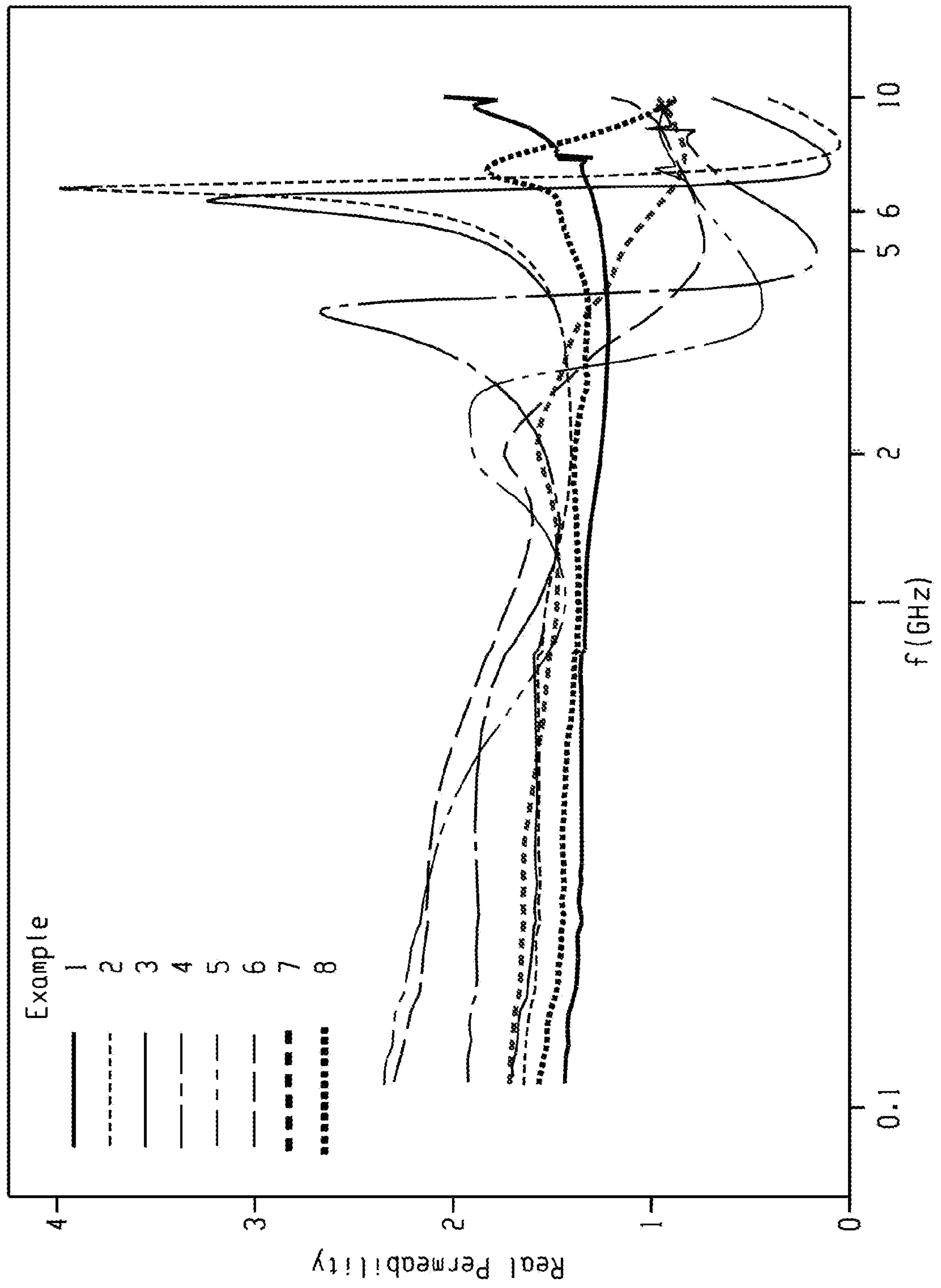
FIG. 3 is a graph of real permeability μ' versus frequency (f) (gigahertz (GHz)) for Examples 1 to 8.

FIG. 3 is a graph of real permeability μ' versus frequency (f) (gigahertz (GHz)) for Examples 1 to 8. FIG. 3 indicates that Examples 6 to 8, which exhibit a maximum real permeability of less than 1.9 over a range of 0.1 to 10 GHz, can provide more desirable results, for example, in terms of real permeability, than Examples 1 to 5.

Figure 4:
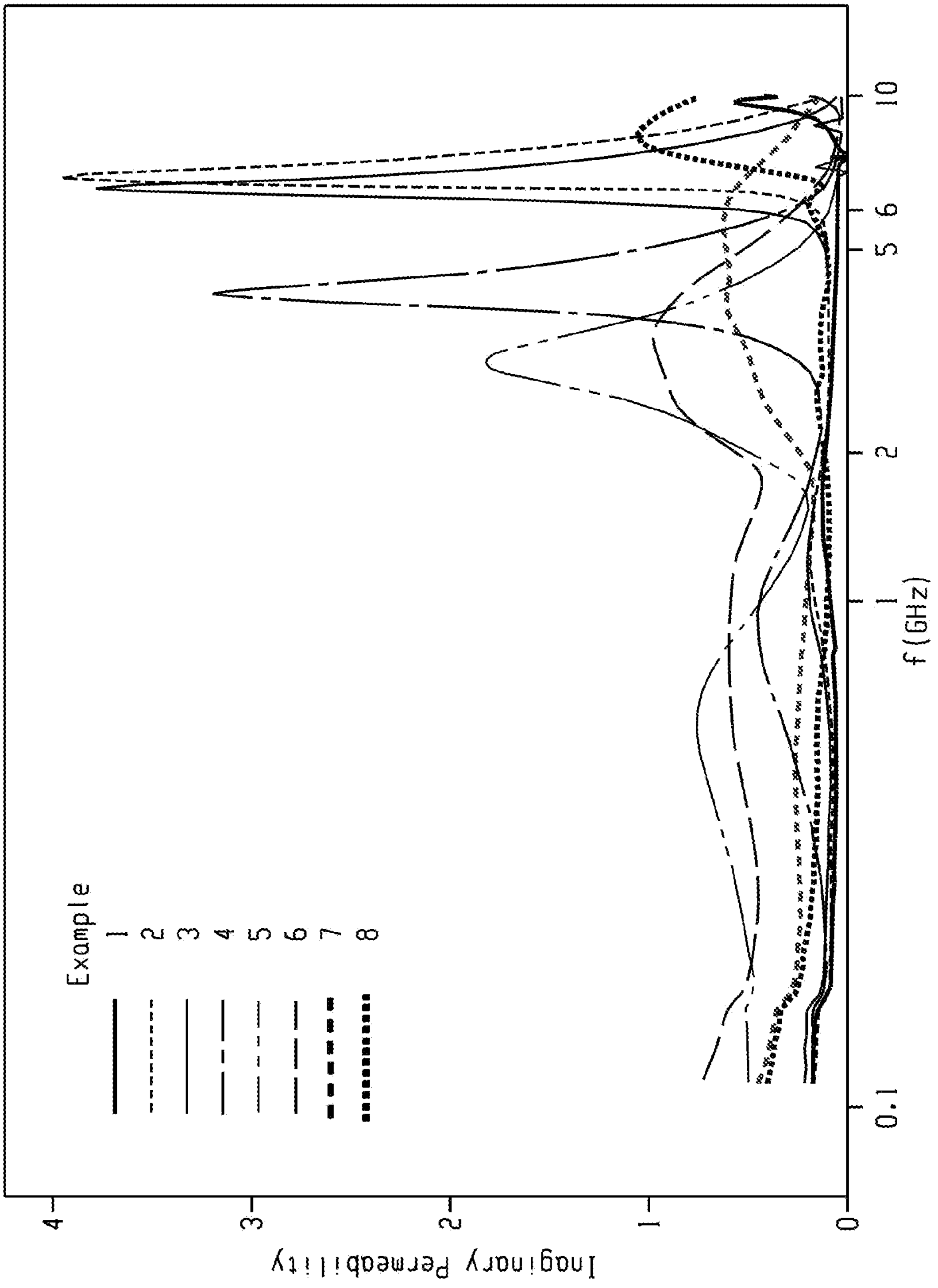
FIG. 4 is a graph of imaginary permeability μ" versus frequency (GHz) for Examples 1 to 8.

FIG. 4 is a graph of imaginary permeability μ" versus frequency (GHz) for Examples 1 to 8. FIG. 4 indicates that Examples 6 to 8, which exhibit a maximum imaginary permeability of less than 1 over a range of 0.1 to 10 GHz, can provide more desirable results, for example, in terms of imaginary permeability, than Examples 1 to 5.

Table 2 provides the saturation magnetization, coercivity, and Curie temperature of each of the Table 1 ferrite compositions. Saturation magnetization, coercivity, and Curie temperature vary with copper content, for example, a molar ratio of copper to nickel in the ferrite composition.

TABLE 2

| Saturation magnetization, coercivity, and Curie temperature | | | |
|---|---|---|---|
| Example | Saturation Magnetization, $\sigma_s$ (emu/g) | Coercivity, $H_C$ (oersted (Oe)) | Curie Temperature, $T_C$ (° C.) |
| 1 | 19.1 (19.1 A · m²/kg) | 1.72 (0.137 kA/m) | 296 |
| 2 | 19.5 (19.5 A · m²/kg) | 0.47 (0.037 kA/m) | 277 |
| 3 | 18.3 (18.3 A · m²/kg) | 2.26 (0.180 kA/m) | 292 |
| 4 | 19.8 (19.8 A · m²/kg) | 24.8 (1.974 kA/m) | 285 |
| 5 | 19.2 (19.2 A · m²/kg) | 11.0 (0.875 kA/m) | 252 |
| 6 | 20.2 (20.2 A · m²/kg) | 25.4 (2.021 kA/m) | 252 |
| 7 | 20.2 (20.2 A · m²/kg) | 28.5 (2.268 kA/m) | 251 |
| 8 | 19.7 (19.7 A · m²/kg) | 49.2 (3.915 kA/m) | 270 |

Tables 3-5 provide real permeability, magnetic loss tangent, permittivity, and dielectric loss tangent of each of the Table 1 ferrite compositions at various frequencies. Example 2 exhibited a desirable combination of high real permeability and low magnetic loss tangent at 4 GHz (1.50 and 0.04, respectively) and 5 GHz (1.67 and 0.04, respectively); and Example 3 exhibited a desirable combination of high real permeability and low magnetic loss tangent at 4 GHz (1.52 and 0.04, respectively) and 5 GHz (1.76 and 0.04, respectively). A desirable combination of high real permeability and low magnetic loss tangent can be, for example, greater than or equal to 1.50 and less than 0.05, respectively (see Example 2 at 4 or 5 GHz; and Example 3 at 4 or 5 GHz), or greater than or equal to 1.50 and less than or equal to 0.04, respectively (see Example 2 at 4 or 5 GHz; and Example 3 at 4 or 5 GHz). Dielectric constant (permittivity (ε')) for Examples 1 to 4 and 6 to 8 was 10 to 15 over a frequency band of 1 to 9 GHz, and the dielectric loss tangent (ε"/ε') was 0.0002 to 0.01 over a frequency band of 1 to 5 GHz (with the exception of Example 4 at 5 GHz; Example 6; and Example 8).

TABLE 3

| | 1 GHz | | | | 2.4 GHz | | | |
|---|---|---|---|---|---|---|---|---|
| Example | μ' | μ"/μ' | ε' | ε"/ε' | μ' | μ"/μ' | ε' | ε"/ε' |
| 1 | 1.33 | 0.05 | 12.81 | 0.002 | 1.24 | 0.06 | 12.86 | 0.0018 |
| 2 | 1.53 | 0.08 | 10.25 | 0.003 | 1.41 | 0.05 | 10.29 | 0.0024 |
| 3 | 1.53 | 0.10 | 10.28 | 0.003 | 1.41 | 0.05 | 10.33 | 0.0025 |
| 4 | 1.57 | 0.23 | 12.16 | 0.0004 | 1.66 | 0.06 | 12.21 | 0.005 |
| 5 | 1.44 | 0.25 | 15.86 | 0.002 | 1.92 | 0.41 | 15.18 | 0.008 |
| 6 | 1.72 | 0.28 | 13.75 | 0.043 | 1.59 | 0.44 | 13.56 | 0.027 |
| 7 | 1.48 | 0.11 | 11.66 | 0.003 | 1.54 | 0.21 | 11.70 | 0.003 |
| 8 | 1.37 | 0.06 | 12.61 | 0.042 | 1.36 | 0.08 | 12.59 | 0.039 |

TABLE 4

| | 4 GHz | | | | 5 GHz | | | |
|---|---|---|---|---|---|---|---|---|
| Example | μ' | μ"/μ' | ε' | ε"/ε' | μ' | μ"/μ' | ε' | ε"/ε' |
| 1 | 1.23 | 0.03 | 12.91 | −0.001 | 1.24 | 0.02 | 12.91 | 0.001 |
| 2 | 1.50 | 0.04 | 10.27 | −0.003 | 1.67 | 0.04 | 10.25 | 0.006 |
| 3 | 1.52 | 0.04 | 10.36 | −0.002 | 1.76 | 0.04 | 10.38 | 0.005 |
| 4 | 2.03 | 1.25 | 11.18 | −0.106 | 0.17 | 4.99 | 12.56 | 0.038 |
| 5 | 0.43 | 1.36 | 16.18 | −0.012 | 0.56 | 0.37 | 15.86 | 0.002 |
| 6 | 0.91 | 0.77 | 13.91 | 0.020 | 0.73 | 0.56 | 13.96 | 0.052 |

TABLE 4-continued

| Example | 4 GHz μ' | μ"/μ' | ε' | ε"/ε' | 5 GHz μ' | μ"/μ' | ε' | ε"/ε' |
|---|---|---|---|---|---|---|---|---|
| 7 | 1.26 | 0.39 | 11.80 | 0.001 | 1.14 | 0.44 | 11.83 | 0.007 |
| 8 | 1.32 | 0.06 | 12.79 | 0.046 | 1.40 | 0.05 | 13.23 | 0.056 |

TABLE 5

| Example | 6 GHz μ' | μ"/μ' | ε' | ε"/ε' | 9 GHz μ' | μ"/μ' | ε' | ε"/ε' |
|---|---|---|---|---|---|---|---|---|
| 1 | 1.28 | 0.02 | 12.91 | −0.004 | 1.72 | 0.07 | 12.03 | 0.059 |
| 2 | 2.21 | 0.06 | 10.19 | −0.003 | 0.17 | 2.58 | 10.68 | 0.012 |
| 3 | 2.79 | 0.18 | 10.48 | −0.021 | 0.39 | 0.48 | 10.61 | 0.021 |
| 4 | 0.37 | 0.63 | 12.58 | −0.014 | 0.89 | 0.02 | 10.95 | 0.015 |
| 5 | 0.73 | 0.08 | 15.61 | −0.007 | 0.95 | 0.02 | 15.61 | 0.019 |
| 6 | 0.77 | 0.27 | 13.75 | 0.080 | 0.98 | 0.02 | 12.71 | 0.053 |
| 7 | 0.98 | 0.51 | 11.75 | 0.012 | 0.88 | 0.21 | 10.51 | 0.007 |
| 8 | 1.46 | 0.10 | 14.69 | 0.113 | 1.10 | 0.74 | 9.60 | 0.170 |

Example 9

A polymer-ferrite composite was made with the hexaferrite composition of Example 4. The calcined ferrite material of Example 4 was crushed and ground into powder with an average particle size 4 to 6 micrometers, followed by mixing with paraffin wax with various contents of ferrite. The composite was shaped into a toroid with an outside diameter of 7 mm, inner diameter of 3 mm, and thickness of 3 to 4 mm for magnetic and dielectric spectrum measurement by vector network analyzer (VNA) in Nicholson-Ross-Weir (NRW) method over a frequency of 0.1 to 18 GHz.

Figure 5:
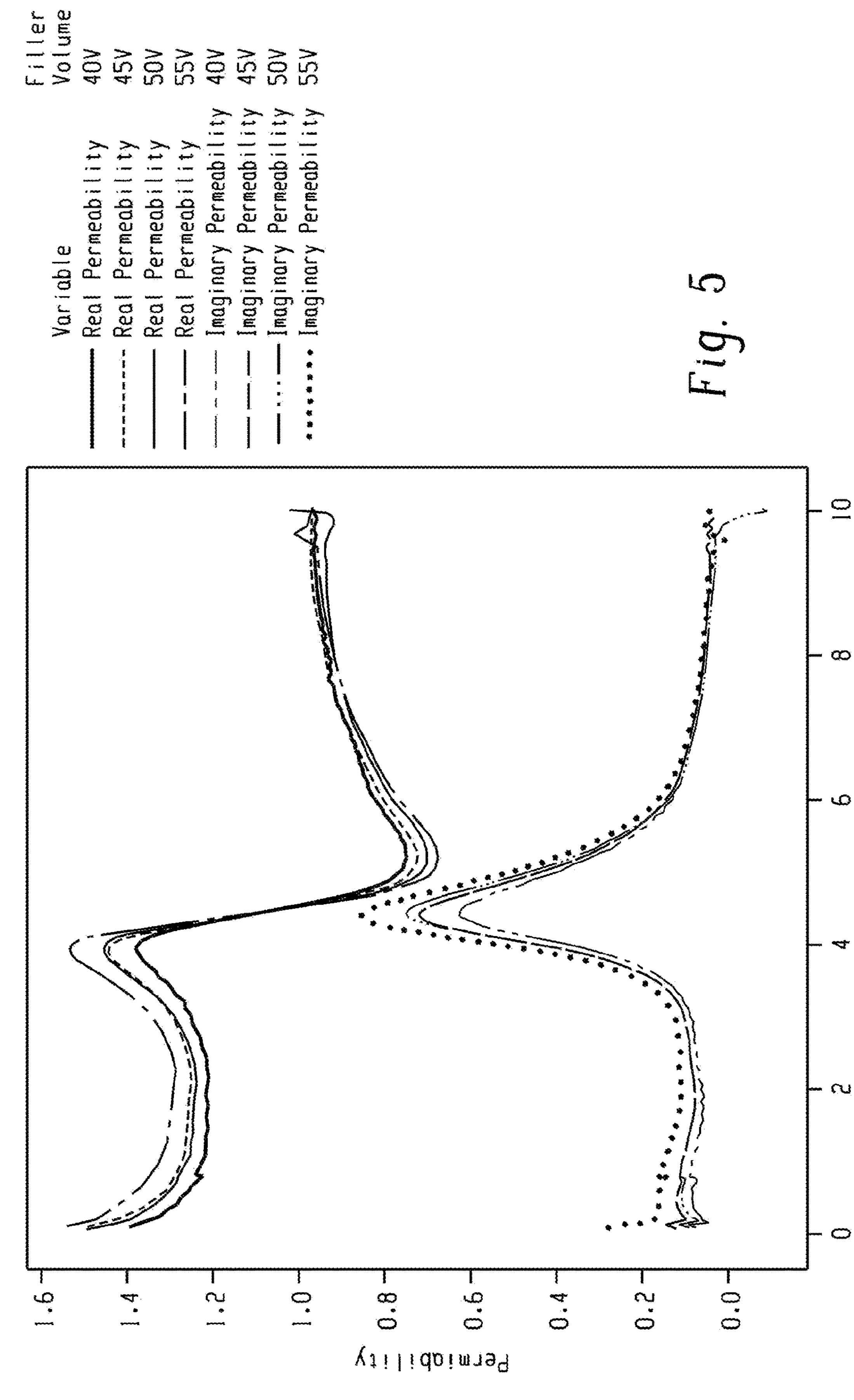
FIG. 5 is a graph of real permeability μ' and imaginary permeability μ" versus frequency (f) (GHz) showing magnetic spectra of the composites of Example 9.
Figure 6:
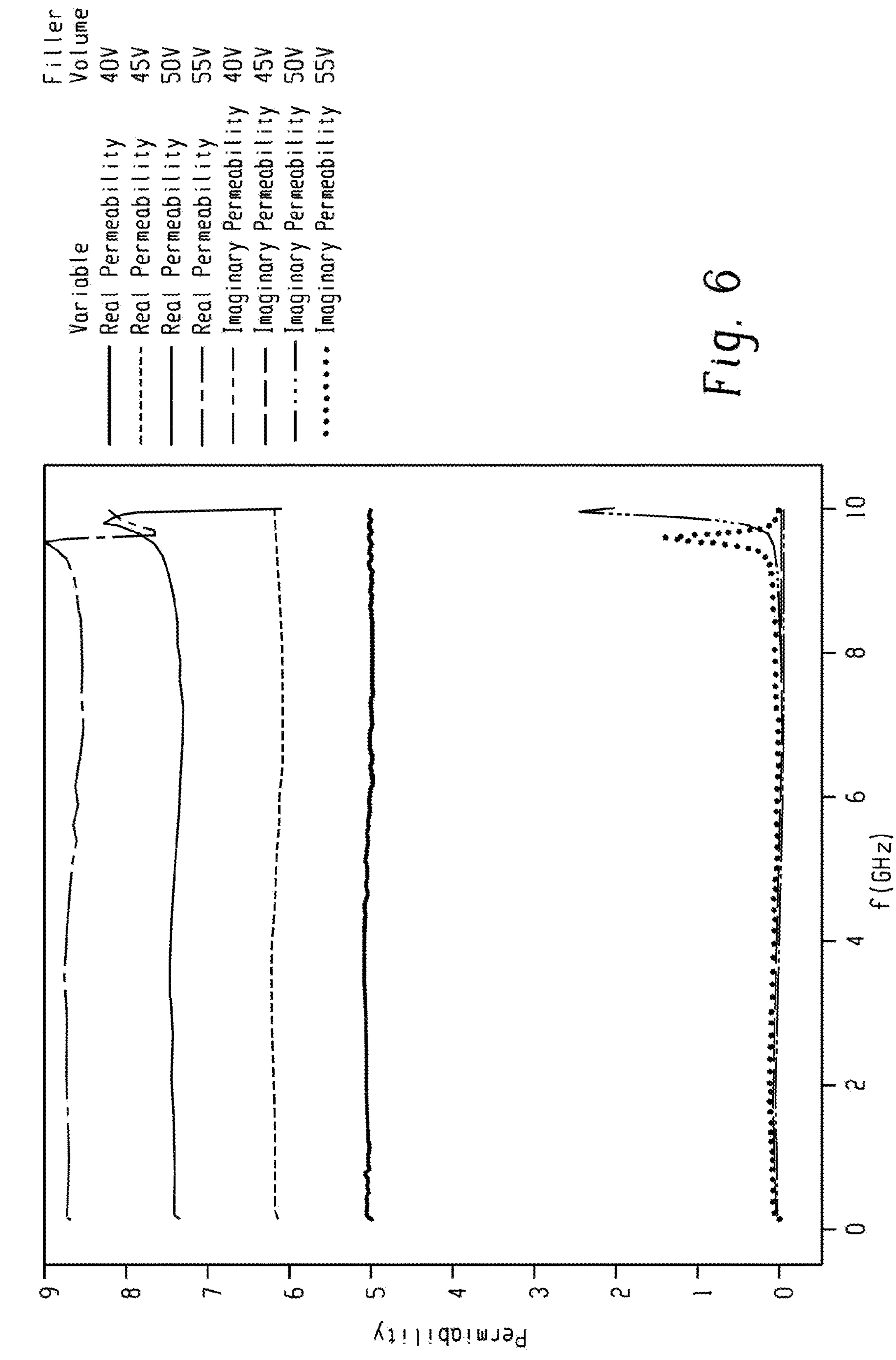
FIG. 6 is a graph of real permittivity ε' and imaginary permittivity ε" versus frequency (f) (GHz) showing magnetic spectra of the composites of Example 9.

The results are provided in Table 6 and plotted in FIG. 5 and FIG. 6. FIG. 5 is a graph of real permeability μ' and imaginary permeability μ" versus frequency and FIG. 6 is a graph of real permittivity ε' and imaginary permittivity ε" versus frequency. The polymer-ferrite composite can be used at a frequency from 1 to 3 GHz with permeability of 1.2 to 1.5, magnetic loss tangent of 0.06 to 0.08, permittivity of 6 to 8, and dielectric loss tangent of 0.002 to 0.006.

TABLE 6

| Ferrite Volume (%) | f (GHz) | Permeability | Magnetic Loss Tangent | Permittivity | Dielectric Loss tangent |
|---|---|---|---|---|---|
| 40 | 0.50 | 1.2798 | 0.0613 | 5.0348 | 0.0034 |
| | 1.00 | 1.2278 | 0.0653 | 5.0281 | 0.0024 |
| | 2.00 | 1.2140 | 0.0488 | 5.0542 | 0.0052 |
| | 3.00 | 1.2526 | 0.0678 | 5.0637 | 0.0021 |
| 45 | 0.50 | 1.3371 | 0.0865 | 6.1774 | 0.0030 |
| | 1.00 | 1.2747 | 0.0809 | 6.1719 | 0.0034 |
| | 2.00 | 1.2543 | 0.0598 | 6.2012 | 0.0065 |
| | 3.00 | 1.2964 | 0.0769 | 6.2115 | 0.0047 |
| 50 | 0.50 | 1.3261 | 0.0778 | 7.4302 | 0.0040 |
| | 1.00 | 1.2622 | 0.0809 | 7.4180 | 0.0039 |
| | 2.00 | 1.2420 | 0.0599 | 7.4507 | 0.0065 |
| | 3.00 | 1.2928 | 0.0761 | 7.4561 | 0.0032 |
| 55 | 0.50 | 1.4053 | 0.1101 | 8.7403 | 0.0050 |
| | 1.00 | 1.3275 | 0.1075 | 8.7222 | 0.0058 |
| | 2.00 | 1.2934 | 0.0797 | 8.7465 | 0.0089 |
| | 3.00 | 1.3462 | 0.0894 | 8.7501 | 0.0058 |

Set forth below are non-limiting aspects of the present disclosure.

Aspect 1: A ferrite composition having a formula of $Ba_xNi_{2-y}Cu_yTi_3Fe_zO_{31}$, wherein $4.5 \leq x \leq 5.5$, $0<y<2$ or $0.05 \leq y \leq 1.5$, and $11 \leq z \leq 13$.

Aspect 2: The ferrite composition of aspect 1, having a formula of $Ba_xNi_{2-y}Cu_yTi_3Fe_zO_{31}$, wherein $5.0 \leq x \leq 5.1$, $0.05 \leq y \leq 1.5$, and $11.7 \leq z \leq 12.0$.

Aspect 3: The ferrite composition of aspect 2, wherein x=5.1.

Aspect 4: The ferrite composition of aspect 2 or 3, wherein z=11.7.

Aspect 5: The ferrite composition of any of the preceding aspects, having a Curie temperature of greater than or equal to 200° C., greater than or equal to 210° C., greater than or equal to 220° C., greater than or equal to 230° C., greater than or equal to 240° C., or greater than or equal to 250° C.

Aspect 6: The ferrite composition of any of the preceding aspects, having a coercivity of less than 50 oersteds (Oe) (3.98 kiloamperes per meter), less than 30 Oe (2.39 kiloamperes per meter), less than 15 Oe (1.19 kiloamperes per meter), less than 5 Oe (0.40 kiloamperes per meter), less than 4 Oe (0.32 kiloamperes per meter), less than 3 Oe (0.24 kiloamperes per meter), less than 2 Oe (0.16 kiloamperes per meter), or less than 1 Oe (0.08 kiloamperes per meter).

Aspect 7: The ferrite composition of any of the preceding aspects, having an average grain size of 1 to 100 micrometers.

Aspect 8: The ferrite composition of any of the preceding aspects, having a magnetic permeability (μ) of 1.5 to 2 at a frequency of 1 to 9 GHz; a magnetic loss tangent (tan $\delta_\mu$) of less than 0.05 at a frequency of 1 to 9 GHz; a permittivity (ε) of 10 to 15 at a frequency of 1 to 9 GHz; a dielectric loss tangent (tan $\delta_\varepsilon$) of less than 0.01, less than 0.08, or less than 0.004 at a frequency of 1 to 9 GHz; a cutoff frequency (resonance frequency, $f_r$) greater than 10 GHz; or a combination thereof.

Aspect 9: The ferrite composition of any of the preceding aspects, having in-plane easy magnetization, an 18H structure, or a combination thereof.

Aspect 10: A method of manufacturing a ferrite composition comprising calcining blended metal source compounds for the ferrite composition of any of the preceding aspects; reducing particle size of the calcined source compounds to obtain particles having an average particle size of 0.5 to 100 micrometers or 0.5 to 10 micrometers; granulating a mixture of the particles and a binder to obtain granules; compressing granules into a green body; and sintering the green body to form the ferrite composition.

Aspect 11: The method of aspect 10, wherein calcining is performed at 900 to 1,200° C. for 0.5 to 20 hours; calcining is performed in an atmosphere of air, nitrogen, oxygen, or a combination thereof; sintering is performed at 1,000 to 1,300° C. for 1 to 20 hours; sintering is performed in an atmosphere of air, nitrogen, oxygen, or a combination thereof; sintering is performed with a temperature heating rate of 1 to 5° C. per minute, a cooling rate of 1 to 5° C. per minute, or a combination thereof; reducing particle size comprises crushing the calcined source compounds, grinding the calcined source compounds, or a combination thereof; or a combination thereof.

Aspect 12: The method of aspect 10 or 11, further comprising sizing the particles.

Aspect 13: The method of any of aspects 10 to 12, further comprising blending the metal source compounds.

Aspect 14: The method of any of aspects 10 to 13, wherein the binder is polyvinylpyrrolidone, poly(vinyl alcohol), polyacrylamide, poly(acrylic acid), polyethylene glycol, polyethylene oxide, cellulose acetate, starch, polypropylene carbonate, polyvinyl butyral, or a combination thereof.

Aspect 15: A composite comprising a polymer matrix; and the ferrite composition of any of aspects 1 to 9, wherein the ferrite composition has a particle size of 0.5 to 30 micrometers.

Aspect 16: The composite of aspect 15, comprising 5 to 95 volume percent of the hexaferrite, based on the total volume of the composite.

Aspect 17: The composite of aspect 15 or 16, wherein the polymer matrix comprises polyvinylidene fluoride, polytetrafluoroethylene, polyethylene, high density polyethylene, low density polyethylene, polymethylmethacrylate, polyether ether ketone, polyethersulfone, or a combination thereof.

Aspect 18: An article comprising the ferrite composition of any of aspects 1 to 9.

Aspect 19: The article of aspect 18, wherein the article is an antenna, an inductor, a transformer, or an anti-electromagnetic interference material.

Aspect 20: The article of aspect 18 or 19, wherein the article is a microwave device.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

The terms "a" and "an" do not denote a limitation of quantity, but rather denote the presence of at least one of the referenced item. The term "or" means "and/or" unless clearly indicated otherwise by context. The endpoints of all ranges directed to the same component or property are inclusive of the endpoints, are independently combinable, and include all intermediate points. Disclosure of a narrower range or more specific group in addition to a broader range is not a disclaimer of the broader range or larger group. A "combination thereof" is open and includes combinations of one or more of the named elements optionally together with one or more like element not named.

Unless defined otherwise, technical and scientific terms used herein have the same meaning as is commonly understood by one of skill in the art to which this disclosure belongs. The term "combination" is inclusive of blends, mixtures, alloys, reaction products, and the like. The permittivity and the permeability as used herein can be determined at a temperature of 23° C.

Reference throughout the specification to "an aspect", "some aspects", "an embodiment", and so forth, means that a particular element (e.g., feature, structure, step, or characteristic) described in connection with the aspect is included in at least one aspect described herein, and may or may not be present in other aspects. Thus, while certain combinations of features have been described, it will be appreciated that these combinations are for illustration purposes only and that any combination of any of these features can be employed, explicitly or equivalently, either individually or in combination with any other of the features disclosed herein, in any combination, and all in accordance with an aspect. Any and all such combinations are contemplated herein and are considered within the scope of the disclosure.

While the disclosure has been described with reference to exemplary aspects, it will be understood by those skilled in the art that various changes can be made and equivalents can be substituted for elements thereof without departing from the scope of this disclosure. In addition, many modifications can be made to adapt a particular situation or material to the teachings without departing from the essential scope thereof. Therefore, it is intended that the disclosure not be limited to the particular aspect disclosed as the best or only mode contemplated for carrying out this invention, but that the disclosure will include all aspects falling within the scope of the appended claims.

What is claimed is:

1. A ferrite composition having a formula of $$Ba_xNi_{2-y}Cu_yTi_3Fe_zO_{31},$$

wherein $4.5 \leq x \leq 5.5$, $0 < y < 2$, and $11 \leq z \leq 13$.

2. The ferrite composition of claim 1, having a formula of $$Ba_xNi_{2-y}Cu_yTi_3Fe_zO_{31},$$

wherein $5.0 \leq x \leq 5.1$, $0.05 \leq y \leq 1.5$, and $11.7 \leq z \leq 12.0$.

3. The ferrite composition of claim 2, wherein $x=5.1$.

4. The ferrite composition of claim 2, wherein $z=11.7$.

5. The ferrite composition of claim 1, having a Curie temperature of greater than or equal to 200° C.

6. The ferrite composition of claim 1, having a coercivity of less than 50 oersteds (Oe) (3.98 kiloamperes per meter).

7. The ferrite composition of claim 1, having an average grain size of 1 to 100 micrometers.

8. The ferrite composition of claim 1, having a magnetic permeability ($\mu$) of 1.5 to 2 at a frequency of 1 to 9 GHz;

a magnetic loss tangent (tan $\delta_\mu$) of less than 0.05 at a frequency of 1 to 9 GHz;

a permittivity ($\varepsilon$) of 10 to 15 at a frequency of 1 to 9 GHz;

a dielectric loss tangent (tan $\delta_\varepsilon$) of less than 0.01 at a frequency of 1 to 9 GHz;

a cutoff frequency (resonance frequency, $f_r$) greater than 10 GHz; or a combination thereof.

9. The ferrite composition of claim 1, having in-plane easy magnetization, an 18H structure, or a combination thereof.

10. A method of manufacturing a ferrite composition comprising:

calcining blended metal source compounds for the ferrite composition of claim 1;

reducing particle size of the calcined source compounds to obtain particles having an average particle size of 0.5 to 100 micrometers;

granulating a mixture of the particles and a binder to obtain granules;

compressing granules into a green body; and sintering the green body to form the ferrite composition.

11. The method of claim 10, wherein calcining is performed at 900 to 1,200° C. for 0.5 to 20 hours;

calcining is performed in an atmosphere of air, nitrogen, oxygen, or a combination thereof;

sintering is performed at 1,000 to 1,300° C. for 1 to 20 hours;

sintering is performed in an atmosphere of air, nitrogen, oxygen, or a combination thereof;

sintering is performed with a temperature heating rate of 1 to 5° C. per minute, a cooling rate of 1 to 5° C. per minute, or a combination thereof;

reducing particle size comprises crushing the calcined source compounds, grinding the calcined source compounds, or a combination thereof; or a combination thereof.

12. The method of claim 10, further comprising sizing the particles.

13. The method of claim 10, wherein the binder is polyvinylpyrrolidone, poly(vinyl alcohol), polyacrylamide, poly(acrylic acid), polyethylene glycol, polyethylene oxide, cellulose acetate, starch, polypropylene carbonate, polyvinyl butyral, or a combination thereof.

14. A composite comprising:

a polymer matrix; and the ferrite composition of claim 1, wherein the ferrite composition has a particle size of 0.5 to 30 micrometers.

15. The composite of claim 14, comprising 5 to 95 volume percent of the hexaferrite, based on the total volume of the composite.

16. The composite of claim 14, wherein the polymer matrix comprises polyvinylidene fluoride, polytetrafluoroethylene, polyethylene, high density polyethylene, low density polyethylene, polymethylmethacrylate, polyether ether ketone, polyethersulfone, or a combination thereof.

17. An article comprising the ferrite composition of claim 1.

18. The article of claim 17, wherein the article is an antenna, an inductor, a transformer, or an anti-electromagnetic interference material.

19. The article of claim 17, wherein the article is a microwave device.

* * * * *